(12) United States Patent
Nakata

(10) Patent No.: US 7,460,779 B2
(45) Date of Patent: Dec. 2, 2008

(54) FOCUS DETECTION SYSTEM

(75) Inventor: Masahiro Nakata, Saitama (JP)

(73) Assignee: Hoya Corporation, Tokyo (JP)

( * ) Notice: Subject to any disclaimer, the term of this patent is extended or adjusted under 35 U.S.C. 154(b) by 321 days.

(21) Appl. No.: 11/268,572

(22) Filed: Nov. 8, 2005

(65) Prior Publication Data

US 2006/0104622 A1 May 18, 2006

(30) Foreign Application Priority Data

Nov. 18, 2004 (JP) .............................. 2004-335022

(51) Int. Cl.
G03B 3/00 (2006.01)
H04N 3/14 (2006.01)
(52) U.S. Cl. ........................................ 396/96; 348/297
(58) Field of Classification Search .................... 396/96, 396/99; 348/297–299
See application file for complete search history.

(56) References Cited

U.S. PATENT DOCUMENTS

| | | | | |
|---|---|---|---|---|
| 5,468,954 | A | * | 11/1995 | Furukawa ................. 250/208.1 |
| 5,808,291 | A | * | 9/1998 | Nakamura ................. 250/201.7 |
| 5,842,058 | A | * | 11/1998 | Hagiwara ................... 396/96 |
| 6,198,506 | B1 | | 3/2001 | Nakata et al. |
| 6,445,883 | B1 | * | 9/2002 | Hamada ...................... 396/96 |
| 6,657,669 | B1 | | 12/2003 | Sato et al. |
| 6,871,018 | B2 | | 3/2005 | Nakata |
| 6,922,526 | B2 | | 7/2005 | Nakata et al. |
| 6,937,818 | B2 | | 8/2005 | Nakata et al. |
| 7,102,675 | B1 | * | 9/2006 | Tokunaga .................... 348/297 |
| 2004/0159769 | A1 | | 8/2004 | Nakata et al. |
| 2006/0104621 | A1 | * | 5/2006 | Nakata ........................ 396/96 |

OTHER PUBLICATIONS

U.S. Appl. No. 11/224,026 to Nakata et al., filed Sep. 13, 2005.
U.S. Appl. No. 11/268,569 to Nakata, filed Nov. 8, 2005.

* cited by examiner

*Primary Examiner*—W. B. Perkey
*Assistant Examiner*—Minh Phan
(74) *Attorney, Agent, or Firm*—Greenblum & Bernstein, P.L.C.

(57) ABSTRACT

A focus detection system includes a line sensor array having areas including pixels, wherein the line sensor array photoelectrically converts object light received by each pixel into electric charges, and outputs accumulated electric charges as an image signal; monitor sensor arrays, adjacent to the areas of the line sensor array, for monitoring amounts of light received thereby to output monitor signals, respectively; a controller which terminates an integral operation of the line sensor array immediately after the monitor signals reach an integration termination value; and a saturation detecting device for detecting whether the image signal reaches a predetermined level of saturation. If the saturation detecting device detects that the image signal reaches the predetermined level of saturation, the controller changes the integration termination value so that the monitor signals reach the integration termination value quicker, and makes the line sensor array perform the integral operation again.

8 Claims, 7 Drawing Sheets

FOCUS DETECTION SYSTEM

BACKGROUND OF THE INVENTION

1. Field of the Invention

The present invention relates to a focus detection system which is incorporated in optical equipment such as an SLR camera.

2. Description of the Related Art

In a conventional phase difference focus detection system incorporated in an SLR camera system to serve an autofocus (AF) system thereof, a pair of object images obtained by pupil division are projected onto a pair of areas on a line sensor (line sensor array) to be converted into a pair of electric charges (electrical signals) by the line sensor, and the pair of electric charges are converted as a pair of image signals, respectively. Thereafter, a phase difference between the pair of object images formed on the line sensor is determined according to the pair of image signals, and a focus state (defocus amount) is determined based on the phase difference.

In the case where such a focus detection system is a multipoint focus detection system capable of focusing on a plurality of focus detection zones, a monitor sensor (monitor sensor array) is installed on each of a plurality of line sensors or each of a plurality of zones on each line sensor which respectively correspond to the plurality of focus detecting zones, and an integral termination operation and an amplification control (auto gain control) on image signals are carried out in accordance with one of the plurality of monitor sensors which has received an object image having the greatest brightness. Therefore, it is seldom the case that the image signal output from any line sensor reaches a level of saturation. This type of multipoint focus detection system is disclosed in, e.g., U.S. Pat. No. 6,198,506.

However, in recent years there has been an increasing tendency to provide a multipoint focus detection system with an elongated line sensor on each of a large number of focus detection zones or on aligned focus detection zones. Accordingly, installing a plurality of monitor sensors on each line sensor or each focus detection zone has become difficult due to the limited chip size of each monitor sensor.

Due to the tendency of increasing the number of focus detection zones and miniaturization of an optical system of the autofocus (AF) system, the amount of light which illuminates the light receiving surface of each line sensor tends to decrease, i.e., there is a tendency for an object image projected onto each line sensor to become dark, which increases the integration time and the operating time of autofocusing operation.

SUMMARY OF THE INVENTION

The present invention has been devised in view of the above described problems in conventional focus detection systems and provides a focus detection system in which the integral operation can be controlled to prevent the image signal output from any line sensor from reaching a level of saturation even if monitor sensors are arranged to correspond to only a part of the line sensors.

The present invention further provides a focus detection system capable of reducing the integration time for the image in the vicinity of midrange brightness. According to an aspect of the present invention, a focus detection system is provided, including at least one line sensor array having a plurality of areas, each of which includes a plurality of pixels, wherein the line sensor array photoelectrically converts object light received by each of the plurality of pixels into electric charge to accumulate the electric charge, and outputs the accumulated electric charge as an image signal; a plurality of monitor sensor arrays, positioned so as to be adjacent to the plurality of areas of the line sensor array, for monitoring amounts of light received by the plurality of areas of the line sensor array to output monitor signals representing the amounts of light, respectively; a controller which terminates an integral operation of the line sensor array immediately after the monitor signals reach an integration termination value; and a saturation detecting device for detecting whether the image signal reaches a predetermined level of saturation. In the case where the saturation detecting device detects that the image signal reaches the predetermined level of saturation, the controller changes the integration termination value so that the monitor signals reach the integration termination value in less time, and makes the line sensor array perform the integral operation again.

It is desirable for the focus detection system to include an amplifier which amplifies the image signal at a predetermined amplification factor. In a normal integral operation, the controller changes the integration termination value in stages so that the integral operation is completed in less time, and increases the predetermined amplification factor in stages if not all the monitor signals reach the integration termination value even after a lapse of a predetermined maximum integration time. The controller changes the integration termination value in stages so that the integral operation is completed in less time without changing the predetermined amplification factor if not all the monitor signals reach the integration termination value even after a lapse of the predetermined maximum integration time in a case where the line sensor array performs the integral operation again.

It is desirable for the controller to change the predetermined maximum integration time to a second predetermined maximum integration time shorter than the predetermined maximum integration time, and make the line sensor array perform the normal integral operation if the amplification factor is one of equal to and smaller than a predetermined multiple of the amplification factor and if an integration time of the integral operation is longer than a predetermined period of time.

The saturation detecting device can detect whether the image signal, which is amplified by the amplifier, reaches the level of saturation.

It is desirable for the focus detection system to include a transfer device for transferring electrical signals accumulated in the plurality of areas, respectively, to the amplifier, wherein the amplifier amplifies the electrical signals output from an output port of the transfer device.

It is desirable for the line sensor array to include a plurality of line sensor arrays, each of which has the plurality of areas.

It is desirable for the focus detection system to be incorporated in a camera to serve as a component of an autofocus system of the camera.

The camera can an SLR camera.

According to the present invention, even if there is a line sensor array or an area whose amount of received light is not monitored by any monitor sensor array, either the amplification factor is reduced or the maximum integration time is shortened to make the line sensor array perform the integration operation again in the case where an image signal reaches a level of saturation, and a false focusing operation which may be caused by output saturation is prevented from being carried out. In the case where the maximum integration time is shortened with no reduction of the amplification factor, the time necessary for the re-integral operation is shortened, which reduces the operating time of the focusing operation.

The present disclosure relates to subject matter contained in Japanese Patent Application No. 2004-335022 (filed on Nov. 18, 2004) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
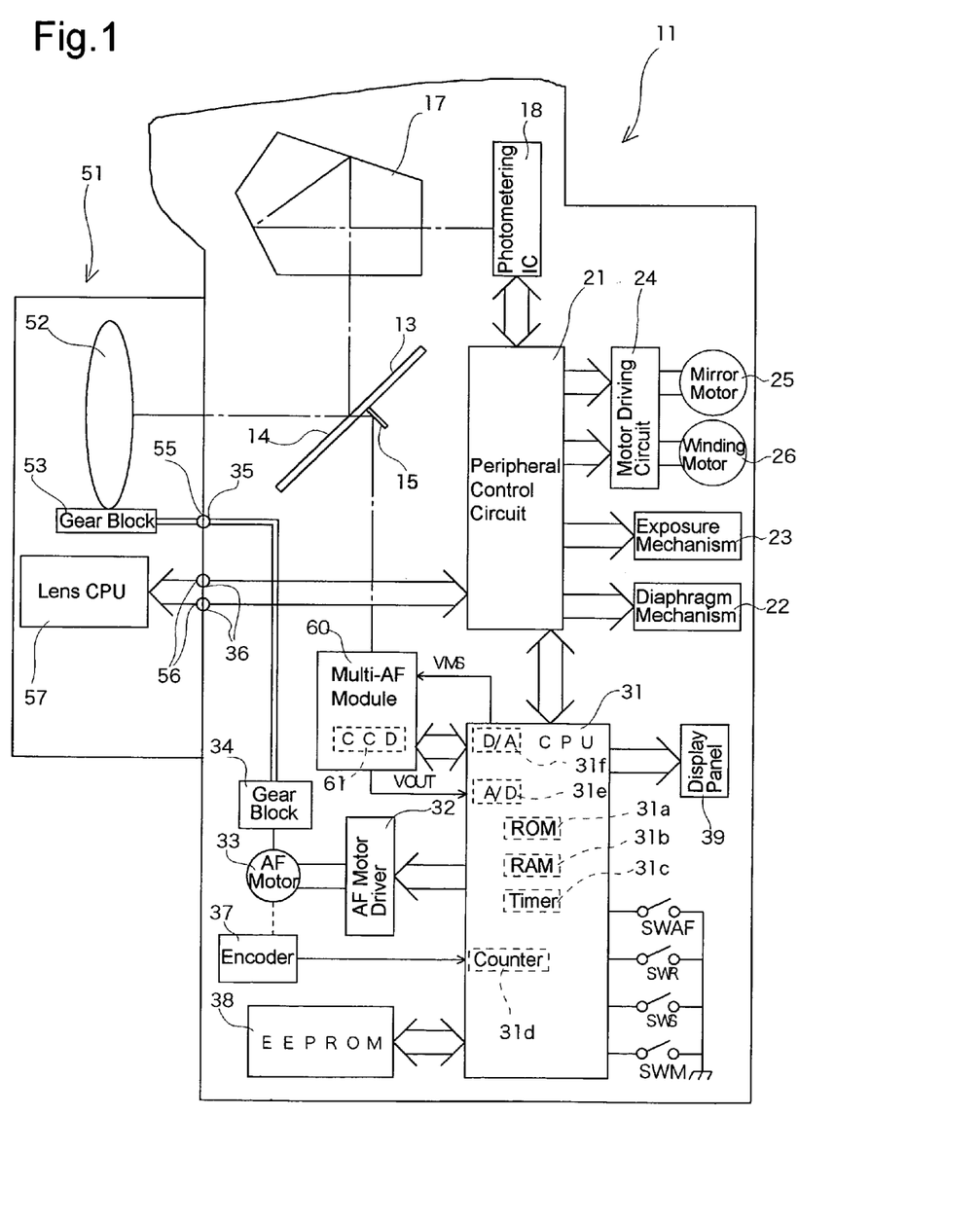
FIG. 1 is a schematic block diagram of elements of an embodiment of a single-lens reflex camera system according to the present invention.

FIG. 1 shows a block diagram of the main components of an AF single-lens reflex camera to which an embodiment of the present invention is applied. The AF single-lens reflex camera includes a camera body 11 having incorporated therein a multi-AF module (multipoint focus detection module) 60 with a CCD focus detection element 61, as a focus detection element, and an AF photographing lens 51 detachably attached to the camera body 11. The camera body 11 includes a body CPU 31 which generally controls the camera body 11 and the photographing lens 51, and which functions also as a selection device, a discrimination device, and a reliability judging device.

The photographing lens 51 is provided with a lens CPU 57 which controls the lens function. The camera body 11 includes a peripheral control circuit 21 which receives and transmits lens data and AF lens driving data, etc., from and to the lens CPU 57 provided in the photographing lens 51.

A large part of an object light bundle incident upon the camera body 11 from the photographing lens 51 is reflected by a main mirror 13 toward a pentagonal prism 17, which constitutes a finder optical system, is reflected by the pentagonal prism 17 and is emitted from an eyepiece (not shown). Part of the object light emitted from the pentagonal prism is incident upon a light receiving element of a photometering IC 18. The light bundle incident upon a half mirror 14 formed at the central portion of the main mirror 13 is transmitted through the half mirror 14 and is reflected downward toward the multi-AF module 60 via a sub-mirror 15 formed at the rear surface of the main mirror 13.

The photometering IC 18 converts the received light into electric signals corresponding to the quantity of light and outputs the electric signals, as the brightness signals, to the body CPU 31 through the peripheral control circuit 21. The body CPU 31 performs an exposure calculation, based on the brightness signal and the film sensitivity data, etc., and calculates an appropriate shutter speed and a diaphragm value for exposure. Upon a photographing operation, the peripheral control circuit 21 drives a mirror motor 25 through a motor drive circuit 24 to move the main mirror upward and drives the diaphragm mechanism 22 to thereby set the diaphragm (not shown) of the photographing lens 51 to the calculated diaphragm value, in accordance with the shutter speed and the diaphragm value obtained by the above-mentioned calculation. Consequently, the exposure mechanism (focal plane shutter) 23 is driven based on the calculated shutter speed to perform the exposure operation. After the exposure operation is completed, the peripheral control circuit 21 drives the mirror motor 25 to move the main mirror 13 downward and drives a film winding motor 26 to wind a film 1 by one frame.

The body CPU 31 includes a ROM 31a in which control program, etc., is stored, a RAM 31b in which data for calculation and control is temporarily stored, a timer 31c, a counter 31d, an A/D converter 31e which A/D-converts the output signal VOUT (integration completion signal/video signal Video) input from the multi-AF module 60 (CCD focus detection element 61) into digital signals, and a D/A converter 31f which converts the monitor reference signal VMS into analogue signals and outputs the analogue signals. Furthermore, the body CPU 31 is connected to an EEPROM 38 which is an external nonvolatile memory device. The EEPROM 38 stores therein various constants inherent to the camera body 11.

The multi-AF module 60 uses a pupil division phase difference method for focus detection, and includes a CCD focus detection element 61 having a plurality of line sensor arrays, and an AF optical system (not shown), in which an object light bundle forming object images in a plurality of focus detection areas is pupil-divided into two light bundles on a focus detection surface equivalent to an image pickup surface and is projected onto the corresponding line sensor arrays.

The CCD focus detection element 61 is provided with the plurality of line sensor arrays which receive and integrate the pair of pupil-divided object light bundles, and a plurality of monitor sensor arrays each of which monitors the quantity of light received by a portion of the associated line sensor array, i.e., each monitor sensor array checks the integrated value. The operation of each line sensor array and each monitor sensor array is controlled by a control circuit of the CCD focus detection element 61. When the monitored voltage (output voltage) of one monitor sensor array reaches a predetermined AGC level, control circuit (of the CCD focus detection element 61) stops the integral operation of the line sensor array corresponding to the monitor sensor array. When the integral operations of all the line sensor arrays are completed, the charges obtained by the integral operation are successively converted into voltage as pixel units for each line sensor array and are output, into video signals Video as pixel units, to the body CPU 31.

The body CPU 31 converts the video signals Video input from the multi-AF module 60 into digital signals in the A/D converter 31e incorporated in the body CPU 31, and performs a predetermined calculation (predicting calculation) based on the digital signals corresponding to the focus detection areas to obtain a defocus amount. The rotational direction of the AF motor 33 is determined based on the calculated defocus amount. The number of revolutions of an AF motor is determined based on the number of AF pulses output from an encoder 37 and this number is set in the counter 31d incorporated in the body CPU 31. The body CPU 31 drives the AF motor 33 via an AF motor driver 32, based on the direction and the number of pulses. When the AF motor 33 is driven, the body CPU 31 counts down the number of pulses output from the encoder 37 in association with the rotation of the AF motor 33, using a built-in counter 35d. When the counted value becomes zero, the AF motor 33 is stopped.

The rotation of the AF motor 33 is reduced by a gear block 34 and is transmitted to the photographing lens 51 through the connection between a joint 35 provided on the body mount of the camera body 11 and a lens joint 55 provided on the lens mount of the photographing lens 51.

A focus switch SWAF which is adapted to switch the focus mode between a manual mode and an AF mode (one shot/continuous AF mode), a photometering switch SWS which is turned ON when a manual release button is depressed by half step, a release switch which is turned On when the manual release button is depressed by full step, and a main switch SWM for controlling the power supply to the peripheral control circuit 21, are connected to the body CPU 31.

The body CPU 31 indicates the current mode such as an AF mode, an exposure mode or a photographing mode, the shutter speed, and the diaphragm value, etc., in a display panel 39. The display panel 39 includes indicators usually provided on the outer surface of the camera body 11 and the field of view finder.

The photographing lens 51 includes the lens CPU 57, a gear block 53 to move a focusing lens 52 in the axial direction, and the lens joint 55 which is provided on the lens mount of the photographing lens 51 and which is disconnectably connected to the body joint 35 of the camera body 11. The rotation of the AF motor 33 is transmitted to the gear block 53 through the gear block 34, the body joint 35 and the lens joint 55, so that a focusing lens group 52 of the photographing lens 51 can be moved through the gear block 53.

The lens CPU 57 is connected to the peripheral control circuit 21 of the camera body 11 through connection between the groups of electrical contacts 56 and 36, so that predetermined data communication can be carried out to transmit and receive information regarding full aperture, the maximum F value, focal length, and the lens position (object distance).

Figure 2:
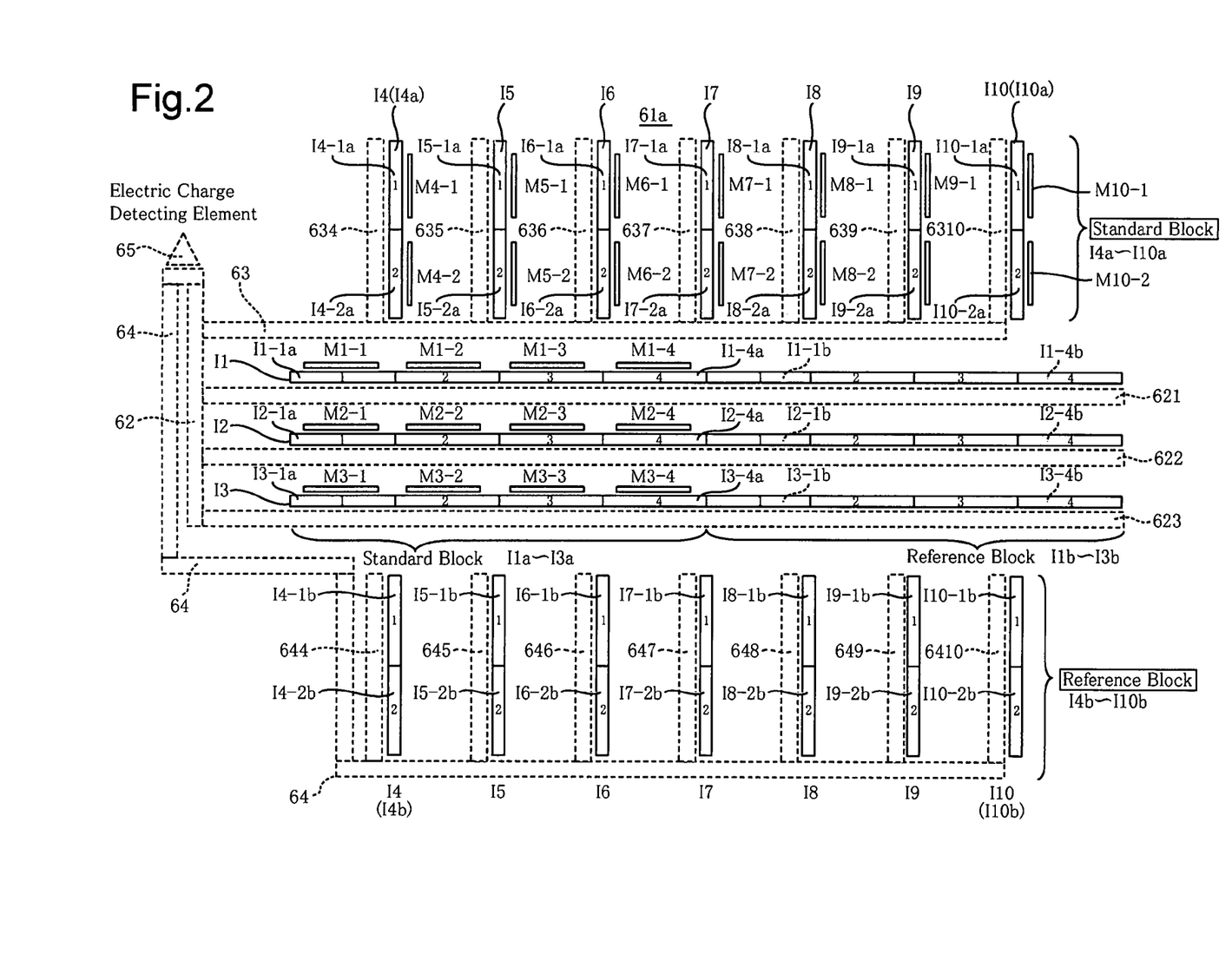
FIG. 2 is a schematic diagram of an embodiment of a multipoint focus detecting device which is incorporated in a camera body of the single-lens reflex camera system shown in FIG. 1.

The structure of the CCD focus detection element 61 that is provided in the multi-AF module 60 incorporated in the camera body 11 will be hereinafter discussed in detail with reference to FIG. 2. FIG. 2 is a diagram showing an embodiment of an arrangement of line sensor arrays I and monitor sensor arrays M on board of a light receiving surface 61a of the CCD focus detection element 61. In the illustrated embodiment, the CCD focus detection element 61 is provided with a single circuit board 80 (see FIG. 3) on which the line sensor arrays I and the monitor sensor arrays M are mounted, and a control circuit 71 for controlling the operations of the line sensor arrays I and the monitor sensor arrays M is mounted on the circuit board 80.

The CCD focus detection element 61 is provided, on the light receiving surface 61a thereof in a vertical center portion thereof, with three rows of horizontal line sensor arrays I1, I2 and I3 which are arranged at regular intervals in the vertical direction and are parallel to one another. The CCD focus detection element 61 is further provided on both vertical sides of the three rows of horizontal line sensor arrays I1, I2 and I3, with two sets of seven columns of vertical line sensors I4, I5, I6, I7, I8, I9 and I10 which are arranged at regular intervals in the horizontal direction to be parallel to one another. The line sensors I1 through I10 are CCD line sensors; each line sensor includes a large number of light receiving elements (photo-receivers) arranged in the elongated direction of the line sensor.

In the three rows of horizontal line sensor arrays I1, I2 and I3, a left half of the three rows of horizontal line sensor arrays I1, I2 and I3, from the center of the light receiving surface 61a, is determined as a standard block (which consists of standard line sensor arrays I1a through I3a) while a right half of the three rows of horizontal line sensor arrays I1, I2 and I3 is determined as a reference block (which consists of reference line sensor arrays I1b through I3b).

In the horizontal line sensor array I1, the standard line sensor array I1a is determined as four standard areas I1-1a through I1-4a and the reference line sensor array I1b is determined as four reference areas I1-1b through I1-4b. Likewise, in the horizontal line sensor array I2, the standard line sensor array I2a is determined as four standard areas I2-1a through I2-4a and the reference line sensor array I2b is determined as four reference areas I2-1b through I2-4b. Likewise, in the horizontal line sensor array I3, the standard line sensor array I3a is determined as four standard areas I3-1a through I3-4a and the reference line sensor array I3b is determined as four reference areas I3-1b through I3-4b.

The monitor sensor arrays M include four monitor sensor arrays M1-1 through M1-4, four monitor sensor arrays M2-1 through M2-4 and four monitor sensor arrays M3-1 through M3-4 which are arranged adjacent to the four standard areas I1-1a through I1-4a, the four standard areas I2-1a through I2-4a and the four standard areas I3-1a through I3-4a, respectively.

The twelve monitor sensor arrays M1-1 through M1-4, M2-1 through M2-4 and M3-1 through M3-4 operate independently of one another to monitor the amounts of light received by the adjacent twelve standard areas I1-1a through I1-4a, I2-1a through I2-4a, and I3-1a through I3-4a, respectively.

The seven vertical line sensor arrays I4, I5, I6, I7, I8, I9 and I10 which are positioned above the three rows of horizontal line sensor arrays I1, I2 and I3 as viewed in FIG. 2 are determined as a standard block (which consists of seven standard line sensor arrays I4a, I5a, I6a, I7a, I8a, I9a and I10a), and the other seven vertical line sensor arrays I4, I5, I6, I7, I8, I9 and I10 which are positioned below the three rows of horizontal line sensor arrays I1, I2 and I3 as viewed in FIG. 2 are determined as a reference block (which consists of seven standard line sensor arrays I4b, I5b, I6b, I7b, I8b, I9b and I10b).

The seven vertical line sensor arrays I4, I5, I6, I7, I8, I9 and I10 of the standard block are each divided into two in the elongated direction (vertical direction as viewed in FIG. 2) to be determined as a pair of standard areas I4-1a and I4-2a, a pair of standard areas I5-1a and I5-2a, a pair of standard areas I6-1a and I6-2a, a pair of standard areas I7-1a and I7-2a, a pair of standard areas I8-1a and I8-2a, a pair of standard areas I9-1a and I9-2a and a pair of standard areas I10-1a and I10-2a, respectively. Likewise, the seven vertical line sensor arrays I4, I5, I6, I7, I8, I9 and I10 of the reference block are each divided into two in the elongated direction (vertical direction as viewed in FIG. 2) to be determined as a pair of standard areas I4-1b and I4-2b, a pair of standard areas I5-1b and I5-2b, a pair of standard areas I6-1b and I6-2b, a pair of standard areas I7-1b and I7-2b, a pair of standard areas I8-1b and I8-2b, a pair of standard areas I9-1b and I9-2b and a pair of standard areas I10-1b and I10-2b, respectively. The monitor sensor arrays M further include seven pairs of monitor sensor arrays: a pair of monitor sensor arrays M4-1 and M4-2, a pair of monitor sensor arrays M5-1 and M5-2, a pair of monitor sensor arrays M6-1 and M6-2, a pair of monitor sensor arrays M7-1 and M7-2, a pair of monitor sensor arrays M8-1 and M8-2, a pair of monitor sensor arrays M9-1 and M9-2 and a pair of monitor sensor arrays M10-1 and M10-2 which are arranged to be adjacent to the pair of standard areas I4-1a and I4-2a, the pair of standard areas I5-1a and I5-2a, the pair of standard areas I6-1a and I6-2a, the pair of standard areas I7-1a and I7-2a, the pair of standard areas I8-1a and I8-2a, the pair of standard areas I9-1a and I9-2a and the pair of standard areas I10-1a and I10-2a of the standard block, respectively.

The fourteen monitor sensor arrays M4-1, M4-2, M5-1, M5-2, M6-1, M6-2, M7-1, M7-2, M8-1, M8-2, M9-1, M9-2, M10-1 and M10-2 operate independently of one another to monitor the amounts of light received by the adjacent fourteen twelve standard areas I4a-1a, I4a-2a, I5a-1a, I5a-2a, I6a-1a, I6a-2a, I7a-1a, I7a-2a, I8a-1a, I8a-2a, I9a-1a, I9a-2a, I10a-1a and I10a-2a, respectively.

In each of the line sensor arrays I1 through I10 that are structured as described above, the standard line sensor array (I1a, I2a, I3a, I4a, I5a, I6a, I7a, I8a, I9a or I10a) receives one of a pair of object images which are obtained by pupil division on the corresponding one of a plurality of focus detection zones, while the reference line sensor array (I1b, I2b, I3b, I4b, I5b, I6b, I7b, I8b, I9b or I10b) receives the other of the same pair of object images.

The CCD focus detection element 61 is further provided with a plurality of shift resisters (transfer devices): three shift resisters 62 through 64, three shift resisters 621 through 623, seven shift resisters 634 through 6310 and seven shift resisters 644 through 6410. More specifically, the shift resister 621 is positioned on the opposite side of the line sensor array I1 from the four monitor sensor arrays M1-1 through M1-4 to be adjacent and parallel to the line sensor array I1, the shift resister 622 is positioned on the opposite side of the line sensor array I2 from the four monitor sensor arrays M2-1 through M2-4 to be adjacent and parallel to the line sensor array I2, and the shift resister 623 is positioned on the opposite side of the line sensor array I3 from the four monitor sensor arrays M3-1 through M3-4 to be adjacent and parallel to the line sensor array I3. Likewise, each of the seven shift resisters 634 through 6310 is positioned on the opposite side of the associated one of the seven line sensor arrays I4 through I10 of the standard block from the associated pair of monitor sensor arrays (M4-1 and M4-2, M5-1 and M5-2, M6-1 and M6-2, M7-1 and M7-2, M8-1 and M8-2, M9-1 and M9-2, or M10-1 and M10-2) to be adjacent and parallel to the associated line sensor array. Each of the seven shift resisters 644 through 6410 is positioned on the left side (as viewed in FIG. 2) of the associated one of the seven line sensor arrays I4 through I10 of the reference block to be adjacent and parallel to the associated line sensor array. The three shift resisters 621 through 623 are connected to the shift resister 62, the seven shift resisters 634 through 6310 are connected to the shift resister 63, and the seven shift resisters 644 through 6410 are connected to the shift resister 64. Each light receiving element of each line sensor array I1, I2, I3, I4, I5, I6, I7, I8, I9 and I10 is provided with a photodiode and an ST (storage) portion (not shown) which stores integrated electric charges, into which the photodiode converts from the received object light, in units of light receiving elements upon the completion of the integral operation of the photodiode.

Immediately after the integral operations of all the line sensor arrays I1 through I10 are completed, the electric charges stored in the ST portions thereof are sequentially read out from an electric charge detecting element 65 (see FIG. 2) via the shift resisters 62, 63 and 64. The shift resister 62 is directly connected to the electric charge detecting element 65. The shift resister 64 is directly connected to the electric charge detecting element 65. The shift resister 63 joins the shift resister 62 to be connected to the electric charge detecting element 65 via the shift-resister 62.

In the present embodiment of the CCD focus detection element 61, electric charges obtained by the standard line sensor arrays I4a, I5a, I6a, I7a, I8a, I9a and I10a of the seven vertical line sensor arrays I4, I5, I6, I7, I8, I9 and I10 of the standard block are transferred to the electric charge detecting element 65 via the shift resister 63, while electric charges obtained by the standard line sensor arrays I4b, I5b, I6b, I7b, I8b, I9b and I10b of the seven vertical line sensor arrays I4, I5, I6, I7, I8, I9 and I10 of the reference block are transferred to the electric charge detecting element 65 via the shift resister 64.

Figure 3:
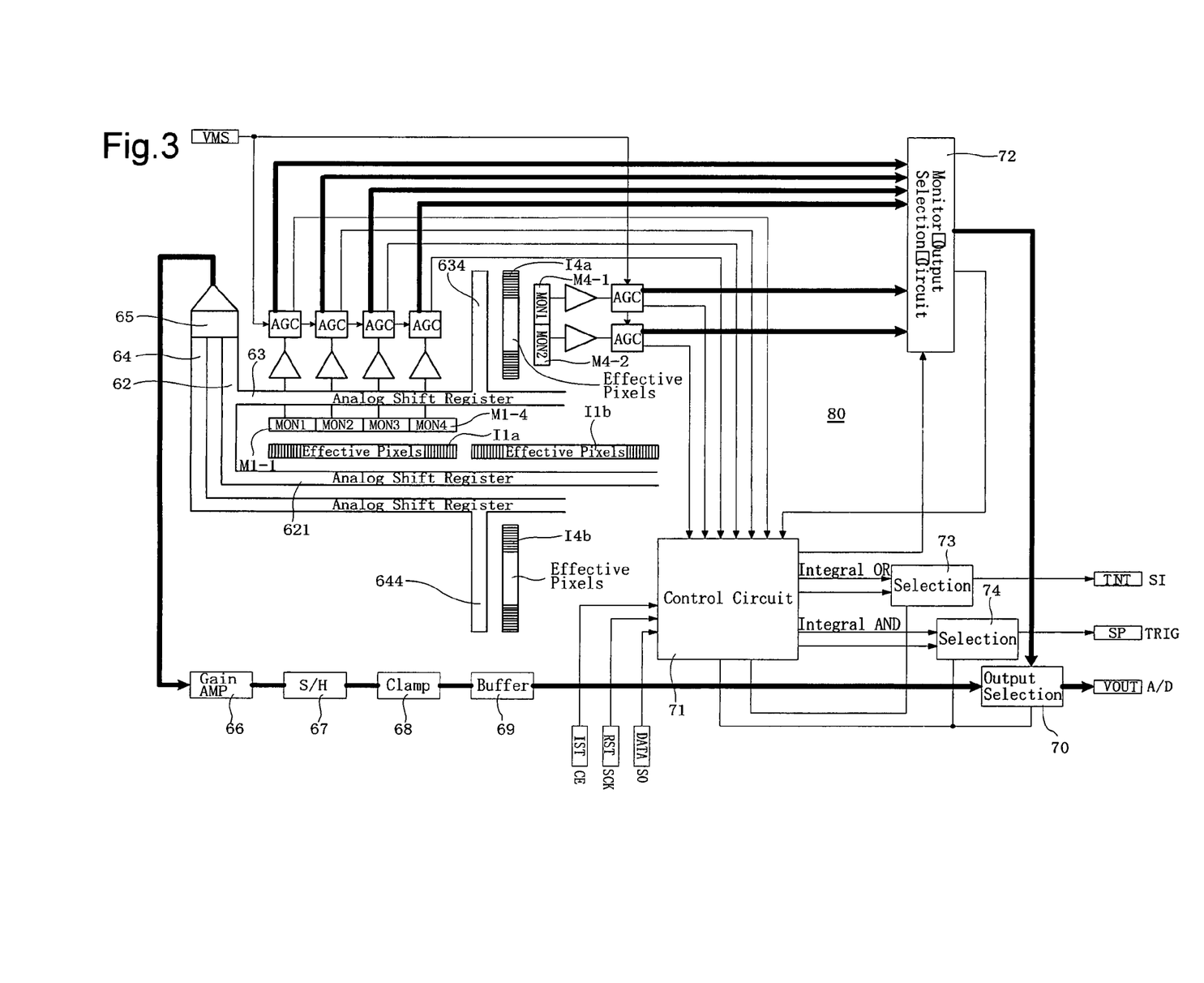
FIG. 3 is a schematic block diagram of elements of a control circuit system provided on a circuit board of the multipoint focus detecting device shown in FIG. 2.

FIG. 3 is a schematic block diagram of elements of a control circuit system which is contained on the circuit board 80 of the CCD focus detection element 61. The operation of the CCD focus detection element 61 is controlled by the control circuit 71 mounted on the circuit board 80. The line sensors I and the monitor sensors M of the CCD focus detection element 61 which are to be used for focusing operation can be selected by the control circuit system of the CCD focus detection element 61. The control circuit 71 operates at a command received via data communications performed between the control circuit 71 and the body CPU 31. In the present embodiment of the CCD focus detection element 61, the operations of the line sensors I and the monitor sensors M which are assigned by a command from the body CPU 31 are selected by the control circuit 71 to be controlled thereby.

The operation of the CCD focus detection element 61 will be discussed hereinafter. The basic operations of the line sensor arrays I1 through I10 are the same while the basic operations of the monitor sensor arrays M1 through M1 are the same, and accordingly, only the operations of the horizontal line sensor arrays I1 (I1-1a through I1-4a and I1-1b through I1-4b) and the associated monitor sensor arrays M (the four monitor sensor arrays M1-1 through M1-4) will be discussed thereinafter.

When commencing integration, the control circuit 71 sweep-drives the horizontal line sensor arrays I1 to sweep electric charge accumulated in each pixel (photodiode) immediately before the commencement of integration in order to commence integration (electric charge accumulation) in units of pixels. At the same time, the control circuit 71 sweep-drives the four monitor sensor arrays M1-1 through M1-4 to sweep electric charge accumulated in each pixel (photodiode) immediately before the commencement of integration in order to commence an accumulated-charge monitoring operation by the four monitor sensor arrays M1-1 through M1-4. The output voltage of each of the four monitor sensor arrays M1-1 through M1-4 controls the integration time at an associated auto gain controller AGC via an associated buffer. The operation of each auto gain controller AGC is controlled by a VMS signal output from the body CPU 31.

The monitor signals output from the auto gain controllers AGC are input to the control circuit 71 and a monitor output selection circuit 72. The control circuit 71 is provided therein with logic devices (e.g., operational amplifiers), each of which serves as a detector for detecting that the associated monitor signal has reached an AGC level (integration termination value), and the control circuit 71 outputs an integration OR signal to a port TNT via a selection circuit 73 immediately after the output of any logic device varies. With this integration OR signal output to the port TNT, the body CPU 31 determines that the integral operation of one of the horizontal line sensor arrays I1 has been completed. In the present embodiment, the control circuit 71 changes the level of the integration OR signal that is output to the selection circuit 73 from a high level to a low level when the level of the output of any one of the aforementioned logic devices changes from a high level to a low level. Note that the signal level of the integration OR signal is high at the commencement of the integral operation.

On the aforementioned variation in the output of any logic device, namely, immediately after the associated motor signal has reached the aforementioned AGC level, the control circuit 71 terminates the integral operation of the line sensor array I associated with the monitor sensor M having output the aforementioned motor signal. This process of terminating the integral operation is to terminate the accumulation of electric charges in the ST portion of the corresponding one of the line sensor arrays I1 through I10.

The monitor signals input to the monitor output selection circuit 72 are output to an output selection circuit 70 to be output from a port VOUT via the output selection circuit 70.

The body CPU 31 outputs a signal DATA for monitor sensor designation to the CCD focus detection element 61. The control circuit 71 of the CCD focus detection element 61 selects the monitor signals output from the selected monitor sensor arrays M at the monitor output selection circuit 72, and outputs the selected monitor signals to the body CPU 31 as a signal VOUT via the output selection signal 70. At the same time, the control circuit 71 outputs an integral AND signal to a port SP via a selection circuit 74, while the body CPU 31 inputs this integral AND signal from a port TRIG and continues to convert the input monitor signals into digital signals until the signal level of the integral AND signal reaches a level "L".

The body CPU 31 converts the input monitor signal of the monitor sensor M into a digital signal to use this digital signal for use of predicting the integration time and the gain (G) setting.

Upon the commencement of integration, the CCD focus detection element 61 in the preset embodiment of the focus detection system selectively outputs the monitor signals to the output selection circuit 70 so that the output selection circuit 70 outputs the monitor signals as a signal VOUT. Immediately after the monitor signals output from all the designated monitor sensors M reach the AGC level or after a predetermined period of time (maximum integration time) elapses, whichever occur first; namely, upon the completion of integration of all the line sensor arrays I or the forced termination of integration, image signals (video signals Video) which are read out of the line sensor arrays I are output as a signal VOUT via the output selection circuit 70.

The control circuit 71 outputs the integral AND signal from the port SP via the selection circuit 74 upon detecting that the monitor signals output from all the designated monitor sensors M have reached the AGC level. If the aforementioned predetermined period of time (maximum integration time) elapses before the monitor signals output from all the designated monitor sensors M reach the AGC level, the control circuit 71 forcefully terminates the integral operations of all the line sensor arrays I which correspond to the monitor sensors M whose monitor signals have not yet reached the AGC level, and outputs the integral AND signal (second termination signal) from the port SP to the body CPU 31 via the selection circuit 73.

Upon the completion of all the line sensors arrays I, electric charges are sequentially transferred from the line sensor arrays I1 through I10 to the electric charge detecting element 65 in units of line sensor arrays and in units of pixels thereof via the shift registers 62, 63 and 64 to be converted into voltage signals at the electric charge detecting element 65 to be output to a gain amplifier 66.

After voltage signals in units of electric charge are amplified by the gain amplifier 66, OB voltages are clamped via a sampling/holding circuit 67 and a clamping circuit 68 to be output as signals VOUT (video signals) from the port VOUT via a buffer 69, and the output selection circuit 70. The body CPU-31 inputs the video signals VOUT from a port A/D to the A/D converter 31e. The body CPU 31 converts the input video signals VOUT into digital video signals in units of pixels at the A/D converter 31e and stores the digital video signals in the RAM 31b in sequence.

The CCD focus detection element 61 is constructed so that one monitor sensor array (M1-1 through M1-4, M2-1 through M2-4, M3-1 through M3-4, and M4-1 and M4-2 through M10-1 and M10-2) is not divided and is provided to correspond to one standard area of one line sensor array (I1 through I10), namely, all the monitor sensor arrays M and the standard areas of all the line sensor arrays I1 through I10 are provided in a one-to-one correspondence relationship. Therefore, the output voltage of each monitor sensor array M corresponds to the average output of the associated standard area. Therefore, if the dark area in an object image formed in the same area is great, there is a possibility of the image signal output from any line sensor array (I1 through 10) in this area reaching a level of saturation.

In view of this problem, if the image signal output from any of line sensor arrays I1 through I10 reaches a level of saturation, the AGC level is reduced (in half) and the integral operations of the line sensor arrays I1 through I10 are performed again.

Alternatively, in the case where the gain is not equal to or greater than double the previous gain or the integration time is greater than a predetermined period of time (greater than a half of the maximum integration time), the maximum integration time is reduced in half.

This control makes it possible to prevent a false AF operation, which may be caused by output saturation, from being carried out and to reduce the operating time of the AF operation in the vicinity of midrange brightness.

The automatic focus detection and the focusing operation of the AF single-lens reflex camera of the illustrated embodiment will be discussed below with reference to the flow charts shown in FIGS. 4 through 6B. When a battery (not shown) is loaded in the camera body 11 and the main switch SWM is turned ON, control enters the routine shown in FIG. 4. The body CPU 31 performs the initialization of the system to generally control the camera operation at step S101. The system initialization includes starting the operation of the body CPU 31, reading the micro program from the ROM 31a, and initializing the cache, the input/output port and flags, etc. Thereafter, the operations from step S103 to step S139 are carried out while a predetermined value of voltage is applied from the battery.

Figure 4:
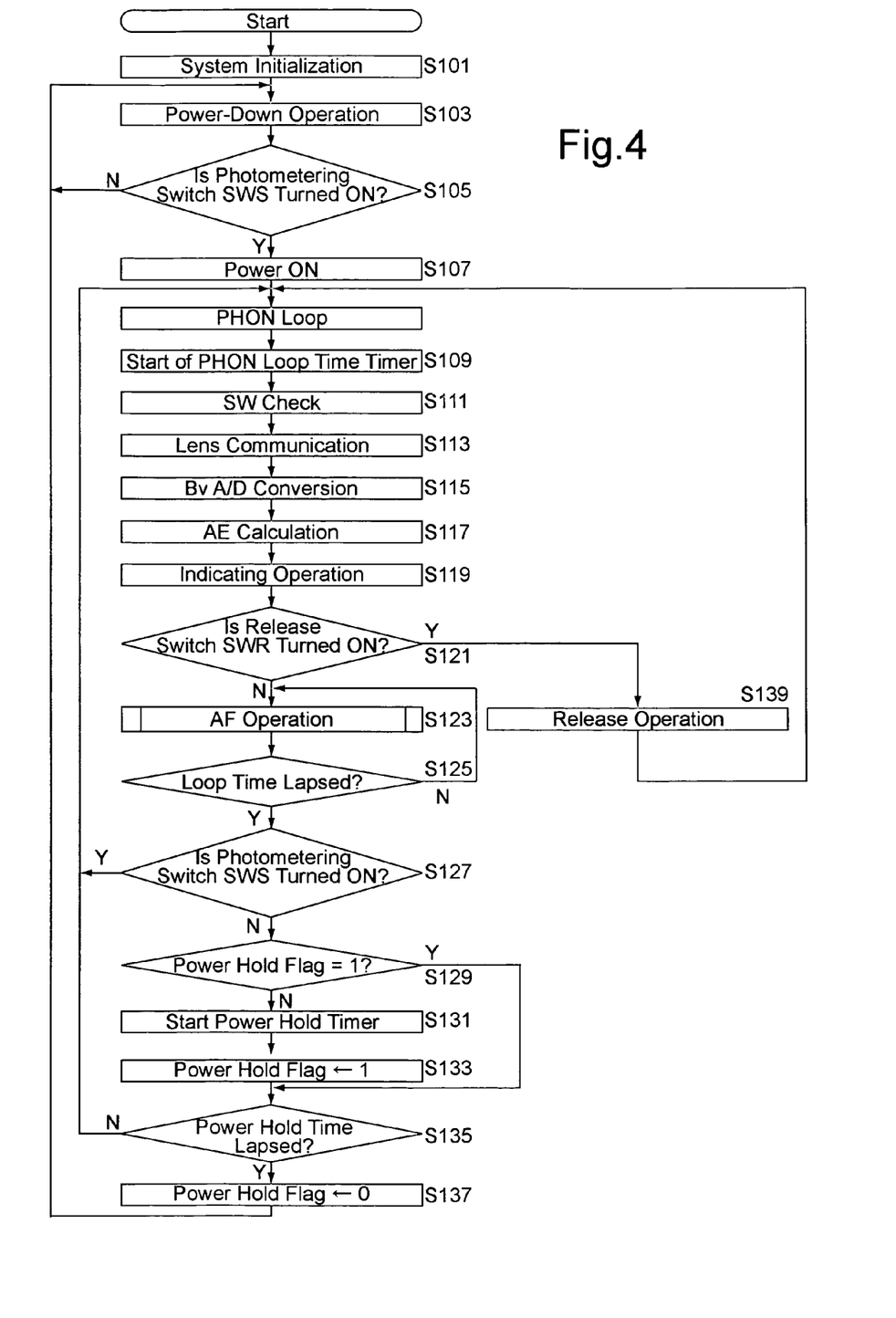
FIG. 4 is a flow chart showing a main process performed in the camera system shown in FIG. 1.

Firstly, a power-down operation is performed to stop power supply to all components other than the body CPU 31 (step S103). Thereafter, whether or not the photometering switch SWS is turned ON is checked (step S105). If the photometering switch is not ON (step S105, N), the power-down operation is carried out (step S103), and the power-down state is maintained. If the photometering switch SWS is turned ON (step S105, Y), the power supply is turned ON (step S107), and control enters the PHON loop. The power-on operation (step S107) is carried out to supply the battery power to all the members including the body CPU 31. As a result, the photographing mode is indicated in, for example, the display panel 39.

<PHON Loop>

In the PHON loop, the PHON loop time timer is started (step S109). The PHON loop time corresponds to an interval at which mainly the AF operations are repeated. Thereafter, the switch checking operation is performed, i.e., the state of each switch is input and the lens communication is carried out to obtain lens data from the photographing lens 51 (step S113).

The object brightness signal Bv obtained by the photometering IC 18 is input from the peripheral control circuit 21 and is A/D-converted (step S115), and an AE calculation operation is carried out by an algorithm corresponding to the selected exposure mode (step S117) to determine the shutter speed and the diaphragm value, which are indicated in the display panel 39 (step S119).

Thereafter, whether or not the release switch SWR is turned ON is checked (step S121). If the release switch SWR is ON (step S121, Y), the release operation is performed (step S139), and control returns to the operation of the PHON loop. If the release switch SWR is not ON (step S121, N), the AF operations are repeated until the loop time lapses (step S123; S125, N). When the loop time has lapsed (step S125, Y), it is determined whether or not the photometering switch SWS is turned ON (step S127). If the photometering switch SWS is ON (step S127, Y), control returns to the first step of the PHON loop.

If the photometering switch SWS is not turned ON (step S127, N), it is determined whether or not the power hold flag is "1" (step S129). If the power hold flag is not "1", the power hold timer is started (step S131), the power hold flag is set to "1", (step S133), and control proceeds to step S135. If the power hold flag is "1" (step S129, Y), control skips steps S131 and S133 and proceeds to step S135.

At step S135, it is determined whether the power hold time has lapsed. If the power hold time has lapsed (step S135, Y), the power hold flag is set to "0" (step S137), and control returns to step S103. If the power hold time has not lapsed (step S135, N), control directly returns to the first step of the PHON loop. In other words, the operations from step S109 to step S135 are repeated until the power hold time, from when the photometering switch SWS is turned OFF, lapses. If the power hold time has lapsed after the photometering switch SWS has been turned OFF, the power hold flag is set to "0", and control returns to step S103 to carry out the power-down operation. In the power-down state, no operation is carried out until the photometering switch SWS is turned ON (step S105).

Figure 5:
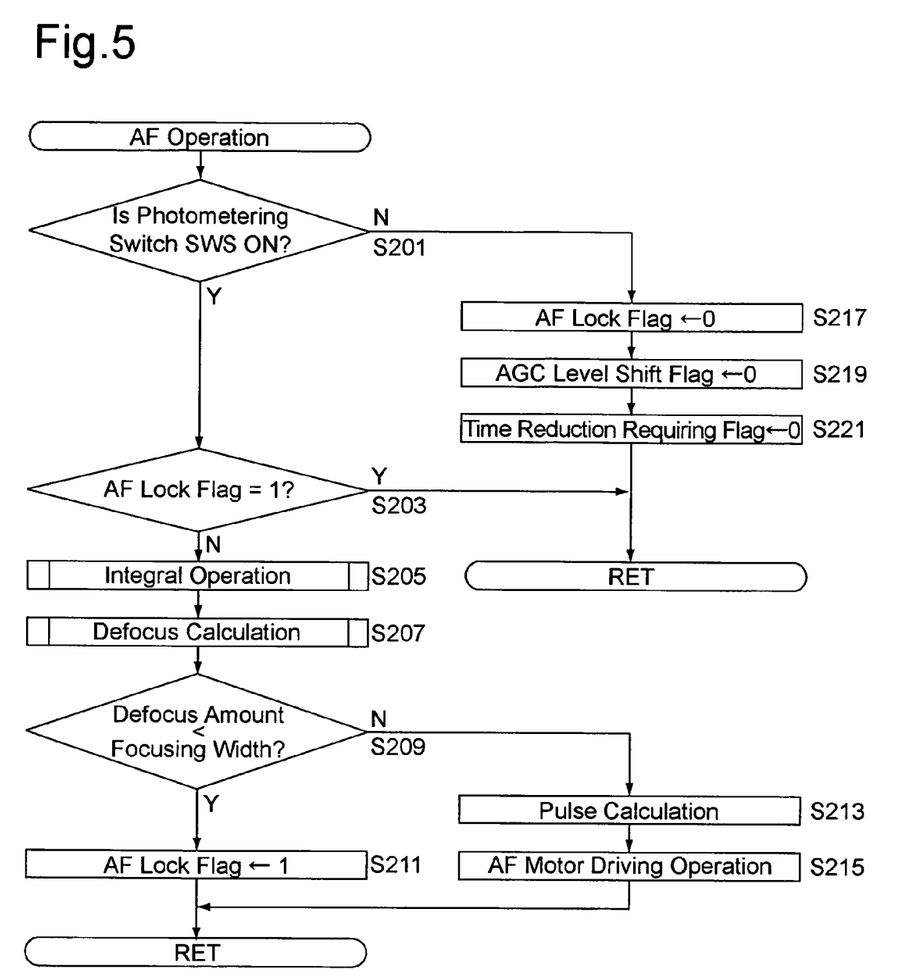
FIG. 5 is a flow chart showing an embodiment of an AF process performed in the main process shown in FIG. 4.

The AF operation at step S215 will be explained below with reference to the flow chart shown in FIG. 5. In the AF operation routine, it is determined whether or not the photometering switch SWS is turned ON (step S201). If the photometering switch SWS is OFF (step S201, N), the AF lock flag, the AGC level shift flag and the time reduction requirement flag are all set to "0" (steps S217, S219, S221). Thereafter, control returns (RET).

If the photometering switch SWS is ON (step S201, Y), it is determined whether or not the AF lock flag is "1" (step S203). The AF lock flag is set to "11" to maintain an in-focus state when the optical system is focused in a one-shot AF mode.

If the AF lock flag is not "1" (step S203, N), the CCD focus detection element 61 performs an integration process (step S205) and the video signal Video is input from the CCD focus detection element 61 to carry out the defocus calculation operation (step S207). Thereafter, it is determined whether or not the calculated defocus amount (absolute value) is within a focusing width (step S209). The focusing width refers to a range of the defocus amount in which the focus state can be considered "in-focus" in view of the depth of focus. The focusing width can be defined by a constant value or can be set by calculation based on the focal length the open diaphragm value input from the photographing lens.

If the defocus amount is not within the focusing width (step S209, N), the number of pulses necessary to drive the AF motor 33 is calculated in accordance with the defocus amount (step S213), and the AF motor is driven (step S215) and control returns (RET).

If the defocus amount is within the focusing width (step S209, Y), the AF lock flag is set to "1" (step S211), and control returns (RET). Once the AF lock flag is set to "1", control returns from S203 if control re-enters the AF operation routine.

[Integration Process]

The integration process that is performed at step S205 will be discussed below with reference to the flow chart shown in FIGS. 6A and 6B. In the integration process, firstly an AGC (auto gain control) level is set to an initial value thereof (step S301). The initial value of the AGC level is predetermined as an appropriate value.

Subsequently, it is checked whether the AGC level shift flag is "1" (step S303). If the AGC level shift flag is "1" (step S303, Y), the AGC level is set to a half of the predetermined value thereof (step S305), and control proceeds to step S307. If the AGC level shift flag is not "1" (step S303, N), control simply proceeds to step S307. When control enters the integration process for the first time, the AGC level shift flag is At step S307 the maximum integration time is set to an initial value. The initial value of the maximum integration time is a predetermined value. Thereafter, it is checked whether or not a time reduction request flag is "1" (step S309). If the time reduction request flag is "1" (step S309, Y), the maximum integration time is set to a half of the predetermined value thereof and control proceeds to step S313. If the time reduction request flag is not "1" (step S309, N), control simply proceeds to step S313. At step S313 the body CPU 31 carries out an integration start communication with the CCD focus detection element 61 to make the CCD focus detection element 61 start performing integration.

Upon the commencement of the integration, it is checked whether or not the integral operation of any one of the line sensor arrays is completed, i.e., whether or not the output level of any monitor sensor array has reached the integration termination value (AGC level) to output an integration OR signal (step S315). If the integration OR signal has not been output (S315, N), the integration time is stored in memory on each line sensor array (step S317), and it is checked whether or not the maximum integration time has elapsed (step S325). If the maximum integration time has not elapsed (step S325, N), it is checked whether or not the integral operations of all the line sensor arrays are completed (whether the monitor signals output from all the designated monitor sensors M have reached the AGC level) (step S327). If the integral operations of all the line sensor arrays are not yet completed (step S327, N), control returns to step S315.

If the integration OR signal has been output (if the output level of any monitor sensor array has reached the AGC level) (S315, Y), an integration completion information communication is carried out (step S319), and it is checked whether or not any line sensor array is under integral operation (step S321). If some line sensor array is undergoing an integral operation (step S321, Y), the integration time of the line sensor array undergoing an integral operation is stored in memory (step S323), and control proceeds to step S325. If none of the line sensor arrays is undergoing an integral operation (step S321, N), control simply proceeds to step S325.

In the case where object images projected onto all the designated monitor sensor arrays M are dark images, etc., it is sometimes the case that the maximum integration time elapses before the monitor signals output from all the designated monitor sensors M reach the AGC level (before the integral operations of all the line sensor arrays I are completed) (step S325, Y). If this is the case, the AGC level is set to a half of the predetermined value thereof (step S329), and it is determined whether or not the integral operation is completed (step S331). If the integral operation is not yet completed (step S331, N), a gain G (amplification factor) is set to double the previous one (step S333), and it is checked whether or not the AGC level shift flag is "1" (step S335). If the AGC level shift flag is already "1" (step S335, Y), the gain G is reduced to a half thereof (step S337). If the AGC level shift flag is not "1" (step S335, N), the gain G is left unchanged (control skips the operation at step S337), and it is checked whether or not the gain G is a maximum gain G (step S339). If the gain G is not the maximum gain G (step S339, N), control returns to step S329. If the gain G is the maximum gain G (step S339, Y), control proceeds to step S327. Namely, an operation reducing the AGC level to a half thereof and doubling the gain G is repeated until either the integral operation is completed or the gain G becomes the maximum gain G. Thereafter, if the integral operation has been completed (step S331, Y) or if the gain G is the maximum gain G (step S339, Y), control proceeds to step S327.

In the process, which starts at step S329 and ends at step S339, performed in the case where the maximum integration time has elapsed (step S325, Y), even if the AGC level is set to a half of the predetermined value thereof (step S329), it is possible to prevent the image signal, output from any line sensor, from reaching a level of saturation by reducing the integration time in half instead of reducing the gain G in half at step S337 if the integral operation is not yet completed (step S331, N), if the gain G is set to double the previous gain thereof (step S333) and if the AGC level shift flag is "1" (step S335, Y).

If the integral operations of all the line sensor arrays have been completed (i.e., if the monitor signals output from all the designated monitor sensors M have reached the AGC level) (step S327, Y) before the maximum integration time elapses (step S325, N), control proceeds to step S341. At step S341, an integration termination communication is carried out on the CCD focus detection element 61 to stop the integral operation of the CCD focus detection element 61. Subsequently, the video signal Video is input from the CCD focus detection element 61, it is checked whether or not there is any pixel data, the output signal of which has reached a level of saturation from the digital signal obtained by converting the input video signal to digital form, and a saturation output flag is set to "1" if there is such pixel data (step S343). Subsequently, a defocus amount calculating operation is carried out on each video signal Video from each line sensor array I (step S345).

Subsequently, it is checked whether the AGC level shift flag is "1" (step S347). If the AGC level shift flag is not "1" (step S347, N), it is checked whether or not the saturation output flag is set to "1" (step S349). If the saturation output flag is "1" (step S349, Y), the AGC level shift flag is set to "1" (step S351) and control returns to step S301 to perform the integration process again. If the saturation output flag is not "1" (step S349, N), control proceeds to step S357.

When re-performing the integration process in the case where there is some pixel data in which the output signal thereof has reached a level of saturation, the AFC level shift flag has been set to "1", and accordingly, the AGC level is set to a half of its predetermined value (S303, Y and S305). Therefore, the integral operation of each line sensor array I can be terminated for a short period of time at the AGC level lower than the initial AGC level, which makes it possible to prevent a false AF operation which may be caused by output saturation from being carried out.

If the AGC level shift flag is "1" (step S347, Y), control proceeds to step S353 in the case of re-performing the integration process because the AGC level shift flag has been set to "1" at step S351.

At step S353 it is checked if the defocus amount calculating operation has ended in failure or if the contrast is low. If the defocus amount calculating operation ends in failure or the contrast is low (S353, Y), the AGC level shift flag is set-to "0" (step S355), and control proceeds to step S357. If neither the defocus amount calculating operation has ended in failure nor the contrast is low (S353, N), control skips the operation at step S355 to proceed to step S357.

At step S357 it is checked if the defocus amount calculating operation has ended in failure, or if the contrast is low, or if the gain G is equal to or more than the double the previous gain. If the defocus amount calculating operation has ended in failure, if the contrast is low or if the gain G is equal to or more than the double the previous gain (step S357, Y), the time reduction request flag is set to "0" (step S363), and control returns (RET). If the defocus amount calculating operation has not yet ended in failure, if the contrast is not low and if the gain G is not equal to or more than the double the previous gain (step S357, N), it is checked whether or not the integration time exceeds a half of the maximum integration time (step S359). If the integration time exceeds a half of the maximum integration time (step S359, Y), the time reduction request flag is set to "1" (step S361) and control returns. If the integration time does not exceed a half of the maximum integration time (step S359, N), control skips the operation at step S361 and returns (RET).

Figure 6A:
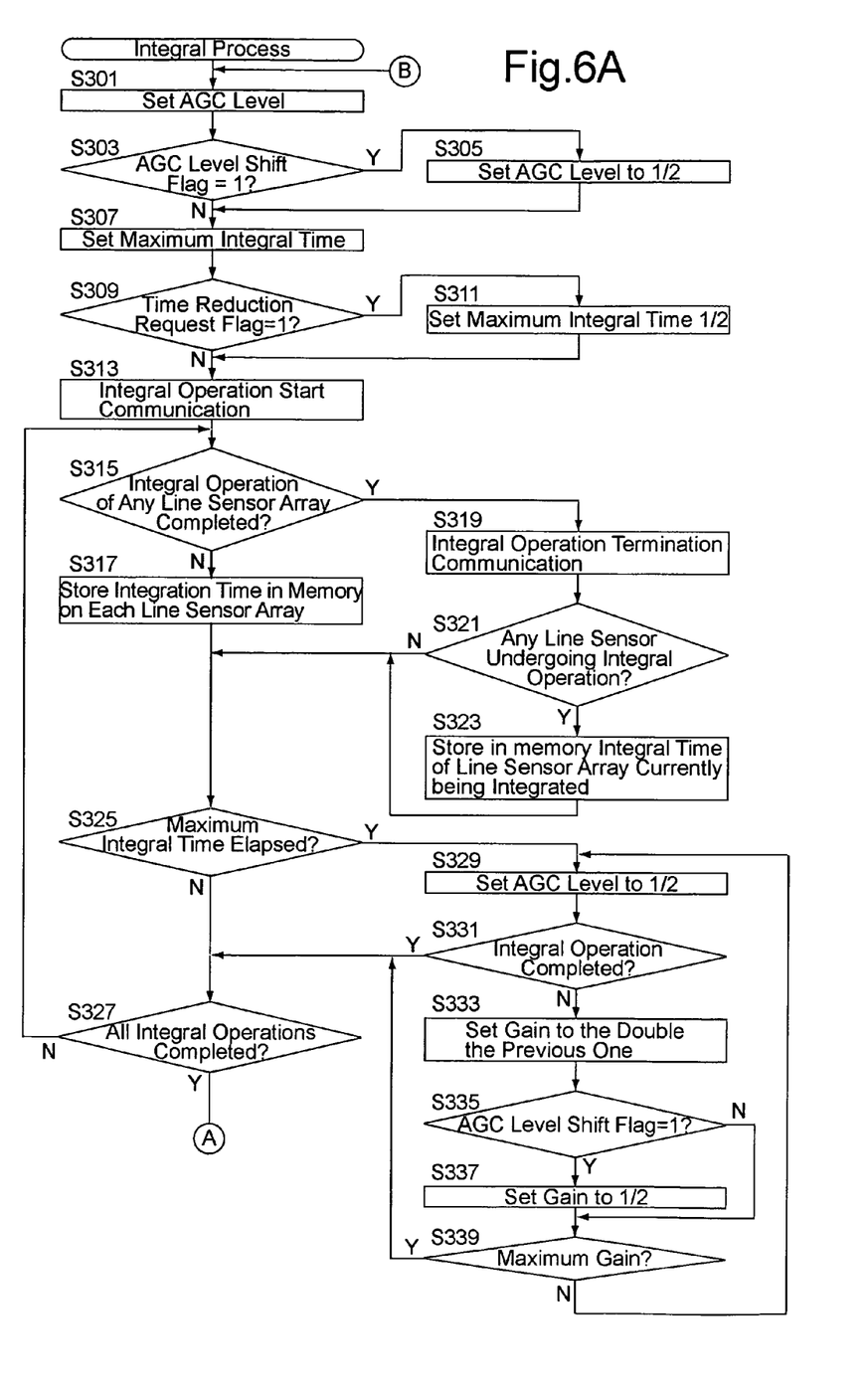
FIGS. 6A and 6B show a flow chart of an embodiment of an integration process performed in the AF process shown in FIG. 5.
Figure 6B:
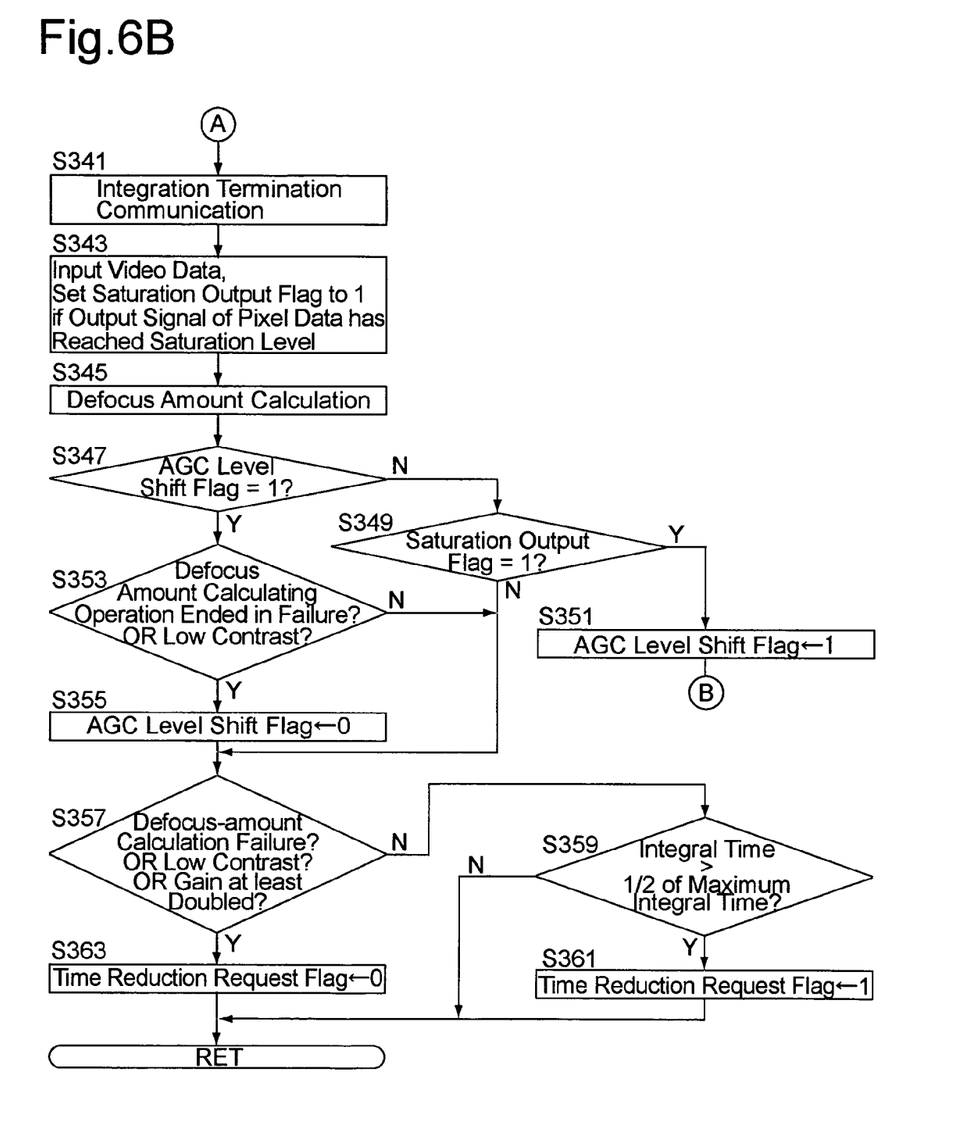

In the case where control returns upon the time reduction request flag being set to "1" (step S361), the maximum integration time is set to a half of the previous maximum integration time when control re-enters the integration process shown in FIGS. 6A and 6B (step S309, Y and step S311), which makes it possible to reduce the time necessary for the integration process in the case where an object to be photographed is relatively dark.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A focus detection system comprising:
    at least one line sensor array having a plurality of areas, each of which includes a plurality of pixels, wherein said line sensor array photoelectrically converts object light received by each of said plurality of pixels into electric charge to accumulate said electric charge, and outputs said accumulated electric charge as an image signal;
    a plurality of monitor sensor arrays, positioned so as to be adjacent to said plurality of areas of said line sensor array, for monitoring amounts of light received by said plurality of areas of said line sensor array to output monitor signals representing said amounts of light, respectively;
    a controller which terminates an integral operation of said line sensor array immediately after said monitor signals reach an integration termination value; and a saturation detecting device for detecting whether said image signal reaches a predetermined level of saturation, wherein, in the case where said saturation detecting device detects that said image signal reaches said predetermined level of saturation, said controller changes said integration termination value so that said monitor signals reach said integration termination value in less time, and makes said line sensor array perform said integral operation again.

2. The focus detection system according to claim 1, further comprising an amplifier which amplifies said image signal at a predetermined amplification factor, wherein, in a normal integral operation, said controller changes said integration termination value in stages so that said integral operation is completed in less time, and increases said predetermined amplification factor in stages if not all said monitor signals reach said integration termination value even after a lapse of a predetermined maximum integration time, and wherein said controller changes said integration termination value in stages so that said integral operation is completed in less time without changing said predetermined amplification factor if not all said monitor signals reach said integration termination value even after a lapse of said predetermined maximum integration time in a case where said line sensor array performs said integral operation again.

3. The focus detection system according to claim 2, wherein said controller changes said predetermined maximum integration time to a second predetermined maximum integration time shorter than said predetermined maximum integration time, and makes said line sensor array perform said normal integral operation if said amplification factor is one of equal to and smaller than a predetermined multiple of said amplification factor and if an integration time of said integral operation is longer than a predetermined period of time.

4. The focus detection system according to claim 2, wherein said saturation detecting device detects whether said image signal, which is amplified by said amplifier, reaches said level of saturation.

5. The focus detection system according to claim 2, further comprising a transfer device for transferring electrical signals accumulated in said plurality of areas, respectively, to said amplifier, wherein said amplifier amplifies said electrical signals output from an output port of said transfer device.

6. The focus detection system according to claim 1, wherein said line sensor array comprises a plurality of line sensor arrays, each of which has said plurality of areas.

7. The focus detection system according to claim 1, wherein said focus detection system is incorporated in a camera to serve as a component of an autofocus system of said camera.

8. The focus detection system according to claim 7, wherein said camera is a single-lens reflex camera.

* * * * *